United States Patent [19]
Tsai et al.

[11] Patent Number: 6,084,573
[45] Date of Patent: Jul. 4, 2000

[54] MULTIPLE MODE ANALOG JOYSTICK INTERFACE

[75] Inventors: Winston Tsai, Milpitas, Calif.;
Francisco L. Duran, Austin, Tex.;
Seng-Khoon Tng, Sunnyvale, Calif.

[73] Assignee: S3 Incorporated, Santa Clara, Calif.

[21] Appl. No.: 09/039,283

[22] Filed: Mar. 12, 1998

[51] Int. Cl.[7] .................................................. G09G 5/08
[52] U.S. Cl. ............................................. 345/161; 463/38
[58] Field of Search ................................... 345/161, 156, 345/157, 162; 463/36, 38; 273/148 B; 200/6 A; 250/221; 74/471 XY

[56] References Cited

U.S. PATENT DOCUMENTS

| | | | |
|---|---|---|---|
| 5,230,059 | 7/1993 | Nielsen et al. | 345/161 |
| 5,710,575 | 1/1998 | Hicok et al. | 345/161 |
| 5,733,194 | 3/1998 | Priem | 463/36 |
| 5,793,356 | 8/1998 | Svancarek et al. | 345/161 |

OTHER PUBLICATIONS

Product: Diamond Multimedia–Monster Sound Card. The Benefits of Dedicated Hardware Acceleration for Audio Monster Sound and Input Devices, Undated.
Product: VLSI's Song Bird chip, Undated.
"Aztech Audio Chip—AZT2320"; Aztech Systems Limited, pp. 1–2, Undated.
"ES1879 AudioDrive® Solution ProductBrief"; ESS Technology, Inc. (SAM0017–111097); pp. 1–4, 1997.
"ES978 ExpansionAudioMixer ProductBrief"; ESS Technology, Inc., pp. 1–4, Undated.
"82C930 16–Bit Sound Controller Data Book"; Revision 1.0, 912–3000–022, Oct., 1994; OPTi Inc.; pp. 1–31.
"82C931 Plug and Play Integrated Audio Controller Data Book", Revision 2.1, 912–3000–035; Aug. 1, 1997; OPTi Inc.; pp. 1–64.

*Primary Examiner*—Regina Liang
*Attorney, Agent, or Firm*—Fenwick & West LLP

[57] ABSTRACT

An analog joystick interface system for overcoming the deficiencies of the conventional analog joystick interface by supporting positional tracking in both a legacy and an enhanced mode. In the legacy mode, the host calculates the relative physical orientation of a positional grip of an analog joystick by relying upon continuous polling techniques. In the enhanced mode, a watch dog timer relieves the host of the need to continuously poll by directly providing the host with positional data concerning the relative physical orientation of the positional grip. The ability of the joystick interface to provide both the legacy and enhanced modes ensures that compability issues concerning the legacy DOS-based software applications and CPU allocation problems associated with continuous polling are resolved without considerably increasing cost or complexity of the joystick interface.

20 Claims, 4 Drawing Sheets

MULTIPLE MODE ANALOG JOYSTICK INTERFACE

BACKGROUND OF THE INVENTION

1. Field of the Invention

The present invention relates to a system and method for interfacing an analog joystick with a digital computer. In particular, the present invention relates to a multiple mode joystick interface for providing an interface with digital characteristics to an analog joystick.

2. Description of Background Art

Many users rely upon electronic computer peripherals as input devices for computer software applications. For example, with regard to word processing software, a conventional keyboard often is used to input text data. In the operation of a graphic design program, a computer mouse or a writing tablet is used to input graphics. With game software, a joystick system usually is used to input two-dimensional positional movement.

FIG. 1 illustrates a conventional joystick system 100 for translating these two-dimensional positional movements into digital data. The joystick system 100 includes two analog joysticks 105a and 105b, an analog joystick interface 102 and a host 180. For simplicity, however, only analog joystick 105a will be discussed in detail. Those skilled in the art will recognize that analog joystick 105b operates in a similar fashion as analog joystick 105a.

The analog joystick 105a includes a positional grip 103, a first potentiometer 107 and a second potentiometer 109. The positional grip 103 pivots within a two-dimensional plane having an X-axis and a Y-axis. The first potentiometer 107 is physically coupled to the X-axis of the positional grip 103. The second potentiometer 109 is physically coupled to the Y-axis of the positional grip 103. Depending upon the direction a user moves the positional grip 103 within this two-dimensional plane, the positional grip 103 alters the resistance levels of either the first potentiometer 107, the second potentiometer 107 or both. For example, by moving the positional grip 103 along the X-axis to the left of the user, the resistance value of the first potentiometer 107 increases. If the positional grip 103 is moved along the X-axis to the right of the user, the resistance value of the first potentiometer 107 decreases. The second potentiometer 109 has a similar proportional relationship to the movements of the positional grip 103 along the Y-axis.

The analog joystick interface 102 includes four charging circuits 101a–d and a positional marker register 160. Each of the charging circuit 101a–d includes an input and an output. The input of the charging circuit (X1) 101a for the X-axis of the first analog joystick 105a is electrically coupled to the first potentiometer 107. The input of charging circuit (Y1) 101b for the Y-axis of the first analog joystick 105a is electrically coupled to the second potentiometer 109. To avoid unnecessary repetition, the charging circuit 101a for the X-axis of the analog joystick 105a will be the focus of the remaining discussion. Those skilled in the art will recognize that charging circuits 101b–101d operate in a similar fashion as charging circuit 101a operates with regard to the X-axis of the first analog joystick 105a.

Charging circuit 101a includes a charger 110, a comparator 120 and a reference circuit 115. The charger 110, which is a capacitor, includes a first input, a second input, and a first output. The first input of the charger 110 is electrically coupled to the first potentiometer 107, thereby creating a conventional resistor/capacitor ("RC") circuit having a conventional variable charging characteristic. As the resistance of the first potentiometer 107 is varied, the voltage $V_p$ across the first potentiometer changes, thereby proportionately altering the charging cycle time $t_{RC}$ for the charger 110 to raise the charger voltage level $V_{RC}$ from 0 volts to a predefined reference voltage level $V_{ref}$.

The comparator 120 includes a first input, a second input and a first output. The first input is electrically coupled to the first output of the charger 110, which transmits $V_{RC}$. The second input is electrically coupled to the reference circuit 115, which transmits $V_{ref}$. The first output of the comparator 120 is electrically coupled to both the memory cell ("X1") (not shown) in the positional marker register 160, which corresponds to the X-axis of the analog joystick 105a, and the second input of the charger 110. The positional marker register 160 is a four memory cell register with the first two memory cells (X1) and (Y1) (not shown) representing the X- and Y-axis of the first joystick 105a and the latter two memory cells (X2) and (Y2) (not shown) representing the X- and Y-axis of the second analog joystick 105b.

When the first input of the comparator 120 receives a $V_{RC}$ voltage level, which matches the $V_{ref}$ voltage level of the second input, the comparator 120 transmits a match signal to the memory cell (X1) of the positional marker register 160 and to the second input of the charger 110. In the positional marker register 160, the match signal inverts the memory cell (X1) from a "1" logic state to a "0" logic state. With regard to the charger 110, the match signal grounds the charger 110 (e.g. lowers $V_{RC}$ to approximately 0 volts) by turning on a transistor (not shown), which is electrically coupled between the charger 110 and electrical ground. Once reset, the charger 110 will again recharge $V_{RC}$ to $V_{ref}$, however, with a new charging rate, which is relative to the new physical orientation of the positional grip 103.

The host 180 is electrically coupled to the positional marker register 160. During the continuous recharging of the charger 110 at different charging rates, the host 180 continuously polls each memory cell to detect the moment that the logic state of one of the memory cells is inverted from the "1" to the "0" logic state. When the host 180 detects such a logic state inversion in a memory cell, such as memory cell (X1), the host 180 will record the relative time, which has elapsed since the last time that the memory cell (X1) was inverted to the "0" logic state. The host then sets the memory cell (X1) back to its original "1" logic state and the charger (X1) again begins to raise $V_{RC}$ from approximately 0 volts to $V_{ref}$.

This relative period of time between inversions of the logic state directly correlates to the charging cycle time $t_{RC}$ for the charging circuit (X1) 101a raising the charging voltage $V_{RC}$ from approximately 0 volts to $V_{ref}$. To calculate the relative position of the positional grip 103 along the X-axis, the host 180 compares this $t_{RC}$ value with the calibrated $t_{RC}$ value for the positional grip 103 in a center position $t_{center}$, a left-most position $t_{left}$, and a right-most position $t_{right}$.

This method of calculating the relative position of the positional grip 103, however, requires that the host 180 poll the positional marker register 160 without interruption. If the host 180 is interrupted, the charging cycle time $t_{RC}$ will become inaccurate, thereby resulting in the host 180 generating incorrect calculations of the relative physical orientation of the positional grip 103.

As operating systems, such as Windows 95, are transformed into preemptive multitasking operating systems, such as Windows NT, which continuously switch between applications, problems associated with interruptions in the continuous polling of the host 180 become inherent. To rectify this problem, a software technique called "spin lock" is used to prevent the operating system from switching to another application until the designated application completes its operation.

This solution to the continuous polling problem, however results in a new difficulty, the reduction of available CPU bandwidth for other applications. Spin lock originally was designed to provide a synchronization mechanism for protecting shared data or resources from simultaneous access by software routines, which are concurrently executed in a preemptive multitasking operating system. When spin lock is used in such a context, CPU bandwidth is partially monopolized for relatively short periods of time (e.g. approximately 25 microseconds). In the continuous polling context, however, spin lock is used to calculate the movements of the positional grip 103 over numerous clock cycles (e.g. periods of time between 500 microseconds–1 millisecond), which is between 20 and 40 times longer than spin lock was designed to operate. Such relatively long periods of time unfortunately result in approximately 5–10% of the overall CPU bandwidth allocation remaining unusable for as long as the host 180 is continuously polling the positional marker register 160.

One attempt to avoid this overuse of CPU bandwidth is to avoid the cause of the problem, the need for the host 180 to continuously poll the positional marker register 160. In place of the conventional analog joystick system 100, a conventional digital joystick system, which relies upon a positional time register to record positional data, is used. Typically, the positional time register is an index register. The digital joystick system includes a digital joystick and a digital joystick interface. This design, however, requires both proprietary software protocols and proprietary hardware. For example, in addition to the digital joystick including potentiometers, the design also must utilize both an analog-to-digital ("A/D") converter and a parallel-to-serial converter. The A/D converter translates the voltage $V_p$ across the potentiometers of the joystick into digital data. The parallel-to-serial converter converts this digital data into a proprietary serial communication protocol, which then is transmitted to the digital joystick interface. To decode the transmitted encoded digital data, the digital joystick interface must rely upon a serial-to-parallel converter. The decoded positional data then is stored in a positional time register, which is accessed without having the host continuously poll.

Even though this system resolves the problems associated with the analog joystick system, the proprietary nature of the digital joystick system still results in at least two disadvantages. First, this alternative proprietary digital design costs more than the conventional analog system 100. Secondly, legacy DOS-based applications, which were programmed to only access positional data from the positional marker register 160 in the analog system 100 will not be able to operate in this digital environment. With positional data only stored in the positional time register, legacy DOS-based software applications will have no means of accessing the positional data.

What is needed is a system and method for interfacing with an analog joystick, which maintains the advantages of the digital joystick system, but without compromising the compatibility with the legacy DOS-based software applications.

SUMMARY OF THE INVENTION

The present invention overcomes the deficiencies of the conventional art by providing an analog joystick system and method that supports positional tracking of a positional grip of an analog joystick in both a legacy (conventional analog) mode and an enhanced (digital) mode. The joystick interface preferably comprises a plurality of charging modules, a positional marker register, and an enhancement module. Each of the plurality of charging modules includes a charging circuit, a circuit interface, and a transitioner. The enhancement module further includes a watch dog timer and a plurality of positional time registers.

In the legacy mode, by inverting a memory cell within the positional marker register to a "0" logic state at a predefined charging circuit reference voltage level, the charging interface marks the completion of a full charging cycle for the corresponding charging circuit. A host, which is continuously polling the positional marker register, then both resets the memory cells in the "0" logic state back to a "1" logic state and uses the relative period of time between consecutive "0" logic state inversions to calculate the charging cycle time $t_{RC}$ of the charging circuit. The host then translates this $t_{RC}$ value into a digital representation of the relative physical orientation of the positional grip of the analog joystick by comparing the $t_{RC}$ value with charging cycle times values of calibrated positions of the positional grip.

In the enhanced mode, by directly providing the host with $t_{RC}$ values of the charging circuits, the watch dog timer relieves the host of the need to continuously poll the positional marker register. Unlike the legacy mode, the host in the enhanced mode no longer has to calculate relative $t_{RC}$ values. Rather, the host directly polls the plurality of positional time register where the $t_{RC}$ values, which are generated by the watch dog timer, are latched and stored.

The ability of the joystick interface to provide both the legacy and enhanced modes ensures that compatibility issues concerning the legacy DOS-based software applications and the CPU bandwidth allocation problems associated with continuous polling are resolved without considerably increasing the cost or complexity of the joystick interface.

DETAILED DESCRIPTION OF THE PREFERRED EMBODIMENTS

The present invention addresses the inherent CPU usage problems associated with the conventional joystick interface by supporting a legacy (conventional analog)/enhanced (digital) mode approach. In the enhanced mode, by relying upon an enhancement module to supply the host with the necessary positional information, the present invention circumvents the need for the host to continuously poll the positional marker register. In the legacy mode, to ensure that legacy DOS-based software products can obtain the necessary positional information from the positional marker register, the present invention still continuously polls the positional marker register.

Figure 1:
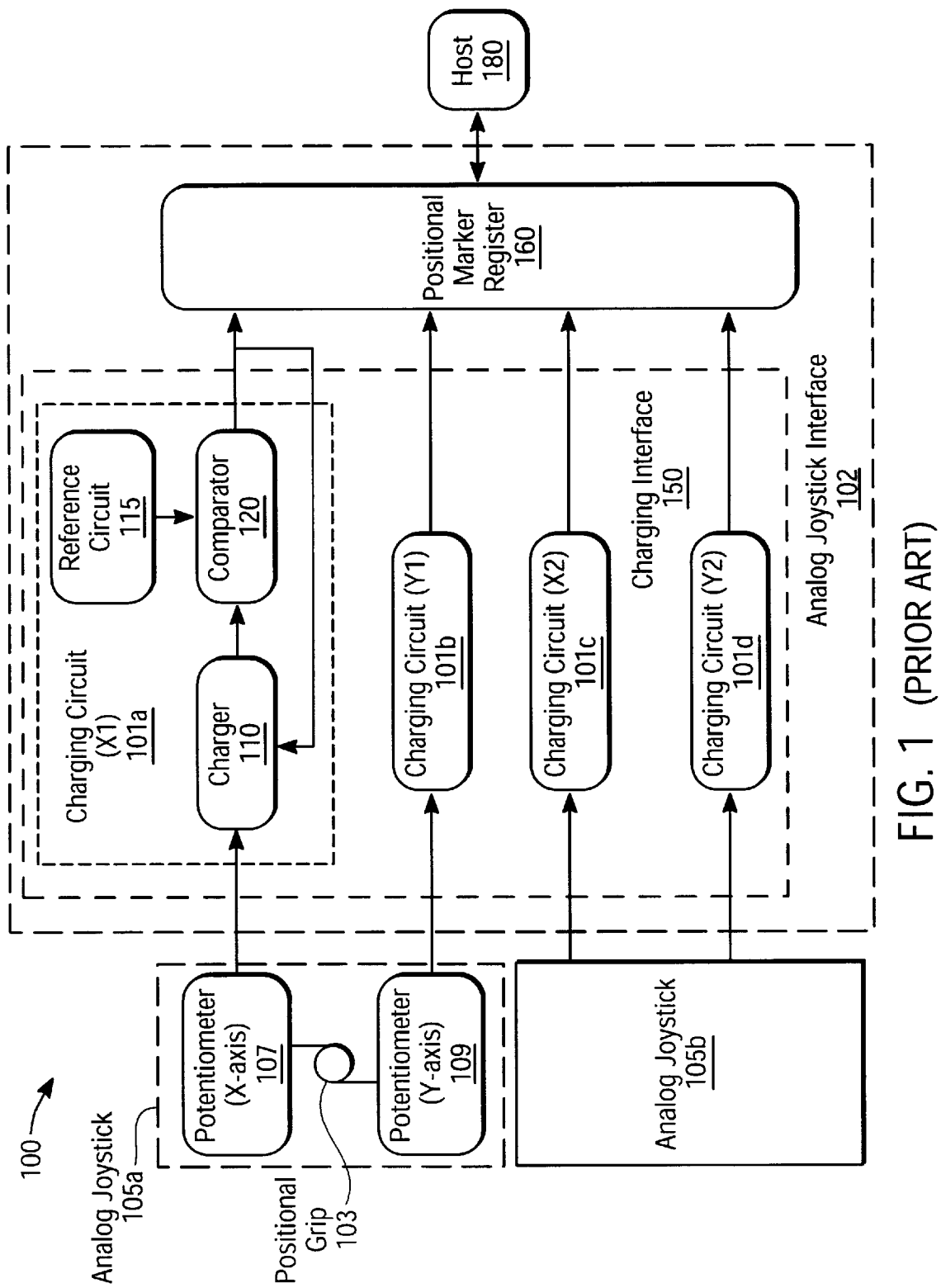
FIG. 1 illustrates an analog joystick in conjunction with an analog joystick interface in a conventional design.
Figure 2:
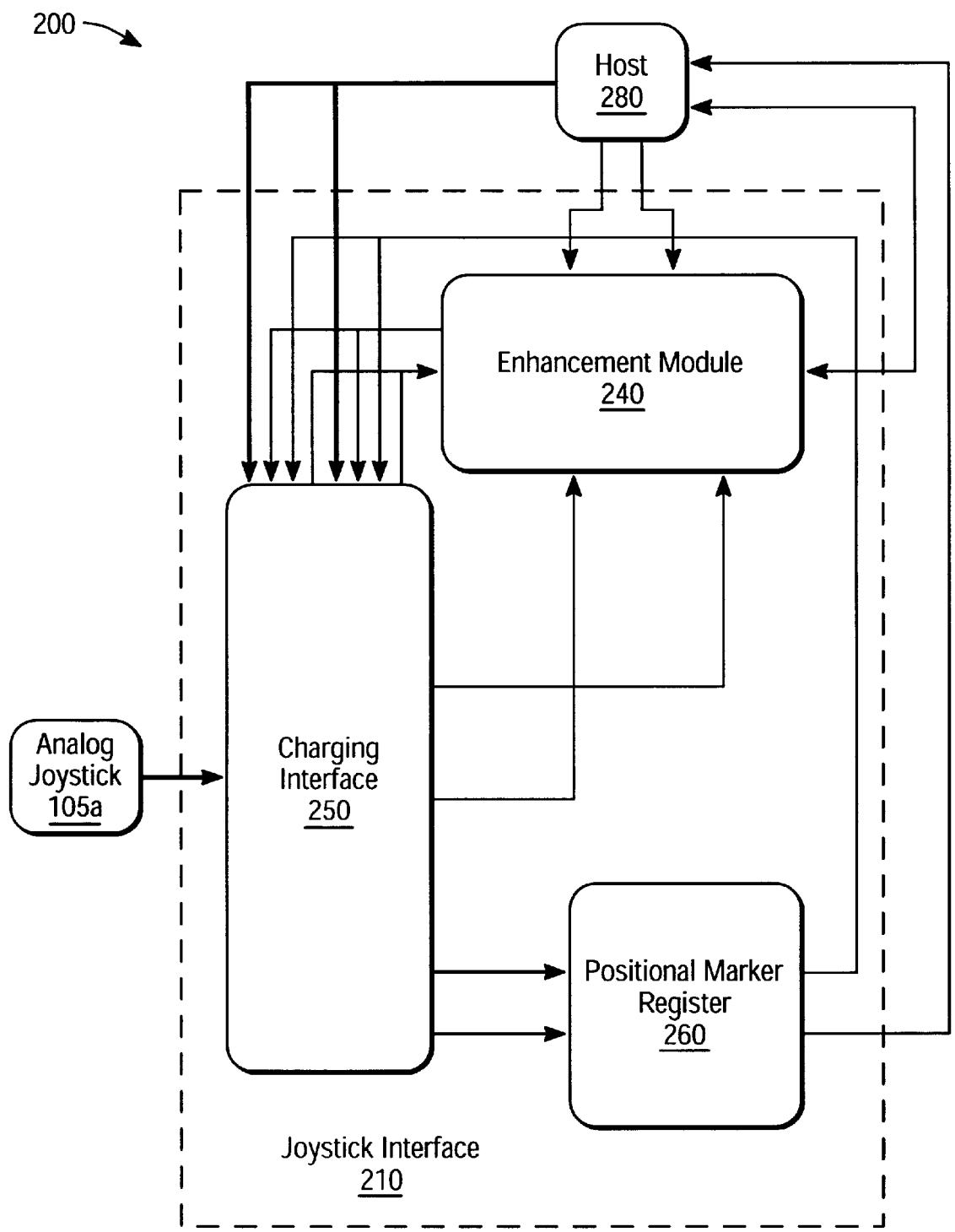
FIG. 2 illustrates a high level view of the present invention.

Such an inventive analog joystick interface system 200 according to the present invention is shown in FIG. 2. The preferred embodiment of the analog joystick interface system 200 comprises at least one conventional analog joystick 105a, a host 280, and a joystick interface 210. In this embodiment, the host 280 is a software application executed by a central processing unit ("CPU") of an Intel-based personal computer. The joystick interface 210 includes a charging interface 250, a positional marker register 260, and an enhancement module 240.

The positional marker register 260 is at least two memory cell register. Each memory cell (not shown) within the positional marker register 260 is either in the "0" or the "1" logic state. In this embodiment, the first memory cell (X1) represents the X-axis of the joystick 105a and the second memory cell (Y1) corresponds to the Y-axis of the joystick 105a. In a default state, each of these memory cells is set to the "1" logic state. When the voltage level $V_{RC}$ of the charging interface 250, which corresponds to one of the two axes, reaches the reference voltage level $V_{ref}$, the charging interface 250 changes the logic state of the memory cell corresponding to that axis from the "1" to the "0" logic state.

When the system is set to the legacy mode, the host 280 continuously polls each memory cell within the positional marker register 260 to detect each change in the memory cell to the "0" logic state. As soon as a specific memory cell is inverted to the "0" logic state, the host 280 records the elapsed time between the current logic state inversion in that cell and the most recent previous inversion of the logic state in that cell. Once $t_{RC}$ is recorded, the host 280 resets the memory cell back to the "1" logic state and awaits the next inversion of the memory cell to the "0" logic state.

These relative periods of time between inversions of the logic state of the memory cell directly correspond to the charging cycle time $t_{RC}$, which elapsed for the charging interface 250 to increase the voltage level $V_{RC}$ for a specific axis from 0 to $V_{ref}$. By comparing this relative $t_{RC}$ value to calibrated charging cycle values, the host 280 can calculate the relative positional orientation of the positional grip (not shown).

In the enhanced mode, the enhancement module 240 eliminates the need for the host 280 to have to continuously poll the positional marker register 260 and calculate relative $t_{RC}$ values. As will be discussed in more detail with regard to FIG. 4, the enhancement module 240 directly provides the calculated charging times $t_{RC}$ to the host 280.

Figure 3:
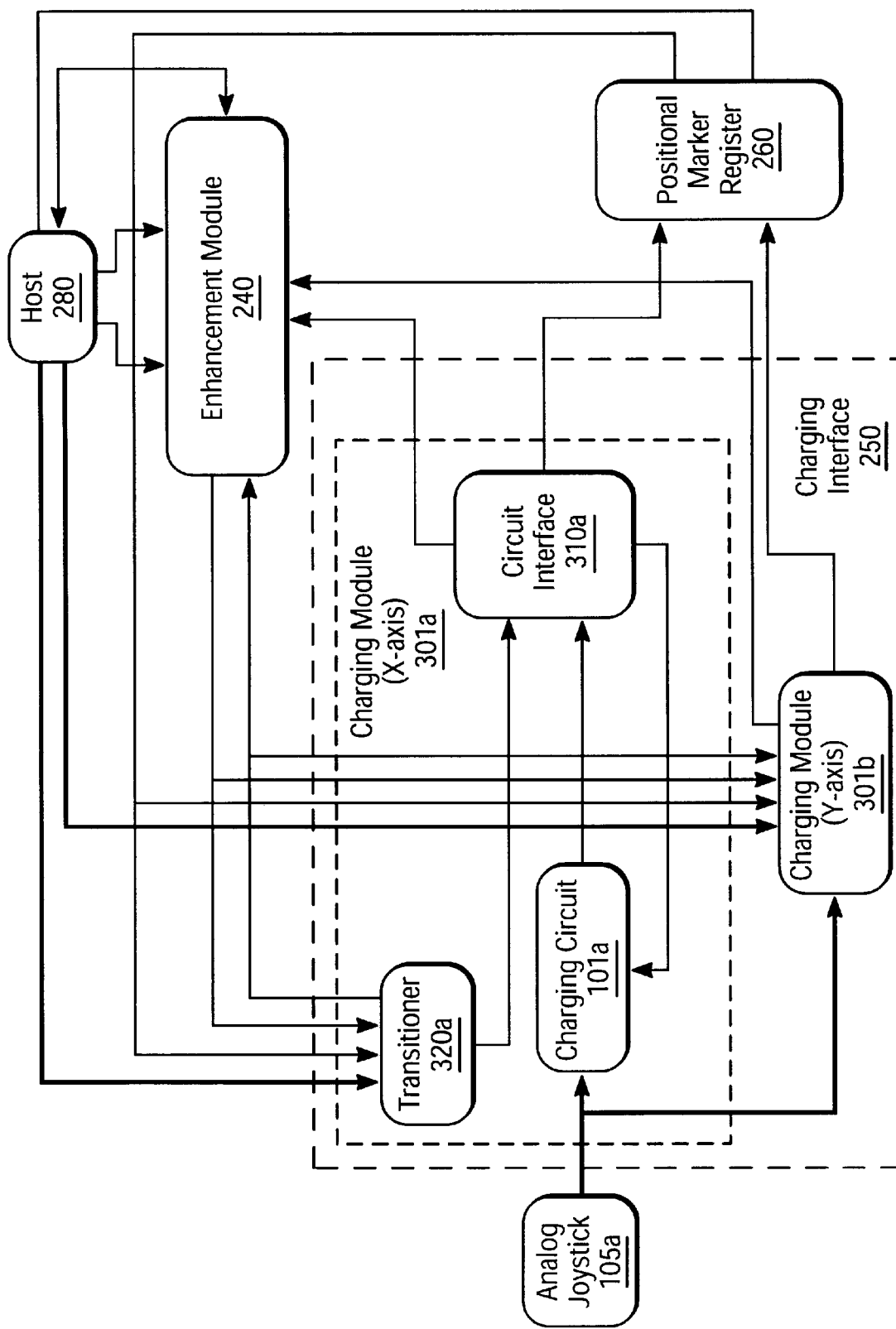
FIG. 3 illustrates a detailed view of the charging interface of the present invention.

The charging interface 250, as illustrated in FIG. 3, comprises a charging module 301a for the X-axis and a charging module 301b for the Y-axis of the analog joystick 105a. As one skilled in the art is well aware, the charging interface 250 has the capability to include more charging modules for accommodating the X- and Y-axes of additional analog joysticks, which could be attached to the system 200. To maintain simplicity, however, throughout FIGS. 2–5, only the system and method associated with the X-axis of analog joystick 105a will be discussed. With regard to the Y-axis of the joystick 105a and the X- and Y-axes of additional analog joysticks, those skilled in the art will recognize that the joystick interface 210 will interact with regard to these axes in a similar fashion as the interface 210 interacts with the X-axis of the joystick 105a.

The charging module 301a for the X-axis of analog joystick 105a includes a transitioner 320a, a charging circuit 101a, and a circuit interface 310a. The transitioner 320a, which in this embodiment is a series of logic gates, includes three inputs and two outputs. The first input is electrically coupled to a first output of the host 280. The second input is electrically coupled to a first output of the memory cell (X1) (not shown) in the positional marker register 260. The first output of the transitioner 320a is electrically coupled to a first input in the circuit interface 310a.

To initiate the legacy mode, the first output of the host 280 transmits a legacy mode signal $S_{legacy}$ to the first input of the transitioner 320a, which results in the first output of the transitioner 320a transmitting a start signal $S_{start}$ in the "1" logic state to the first input of the circuit interface 310a. The first output of the circuit interface 310a responds to the receipt of the "1" logic state by setting the memory cell (X1) in the positional marker register 260 to the "1" logic state. At approximately the same time, the charging circuit 101a begins to charge at a charging rate, which is directly proportional to the resistance value of the X-axis potentiometer (not shown) in the analog joystick 105a.

When the second input of the transitioner 320a detects the presence of the "1" logic state in the memory cell (X1), the first output of the transitioner 320a transmits $S_{start}$ in the "0" logic state to the first input of the circuit interface 310a. A second input of the circuit interface 310a is electrically coupled to a first output of the charging circuit 101a. A first output of the circuit interface 310a is electrically coupled to the memory cell (X1) of the positional marker register 260. In this embodiment, the circuit interface 310a includes logic circuitry and an RS flip flop. The S gate of the RS flip flop corresponds to the first input of the circuit interface 310a. The R gate corresponds to the second input of the circuit interface 310a.

Once the charging circuit voltage $V_{RC}$ matches $V_{ref}$, the first output of the charging circuit 101a transmits a match signal $S_{match}$, which is in the "1" logic state, to the second input of the circuit interface 310a. Based upon conventional RS flip flop logic, by receiving $S_{match}$ in the "1" logic state at the second input of the circuit interface 310a and $S_{start}$ in the "0" logic state signal at the first input of the circuit interface 310a, the first output of the circuit interface 310a switches the memory cell (X1) in the positional marker register 260 to the "0" logic state.

A second output of the circuit interface 310a is electrically coupled to a first input of the charging circuit 101a. In order to reset the charging circuit 101a, the second output of the circuit interface 310a transmits a grounding signal $S_{ground}$ to the first input of the charging circuit 101a. As is well known in the art, the receipt of the $S_{ground}$ by the charging circuit 101a results in a transistor (not shown), which is connected between ground and the charging circuit 101a, turning on and lowering $V_{RC}$ to approximately 0 volts.

Once reset, the charging circuit 101a, which includes a second input that is electrically coupled to the analog joystick 105a, recharges $V_{RC}$ at a new charging rate, which is proportional to the resistive value of the potentiometer relative to the X-axis orientation of the positional grip (not shown) within the analog joystick 105a. As soon as $V_{RC}$ again matches $V_{ref}$, the first output of the charging circuit 101a again transmits $S_{match}$ in the "1" logic state to the second input of the circuit interface 310a, which in turn results in the first output of the circuit interface 310a again switching the logic state in the memory cell (X1) of the positional marker register 260 to the "0" logic state.

The host 280, which continuously polls the positional marker register 260, detects and records the relative time period, between inversions of the memory cell (X1) to the "0" logic state. After each recordation of the relative time period, the host 280 sets the memory cell (X1) in the positional marker register 260 back to the "1" logic state. This relative period of time between detections of the "0" logic state is an approximation of the charging cycle time $t_{RC}$, which has elapsed in recharging $V_{RC}$ from 0 volts to $V_{ref}$. By comparing this $t_{RC}$ value with calibrated charging cycle values for pre-defined physical orientations of the positional grip, the host 280 can calculate the relative position of the positional grip (not shown) within the joystick 105a. The use of continuous polling in this manner ensures that, while operating with the present invention, the large installed base of legacy DOS-based software applications still can obtain the necessary positional information from the positional marker register 260. As one skilled in the art can see from the discussion relating to the relative positional orientation of the positional grip along the X-axis, relative movements along different axes (whether the Y-axis of the joystick 105a or the X- and Y-axis of a second joystick 105b) also can be calculated in a similar manner as that used for the X-axis.

Figure 4:
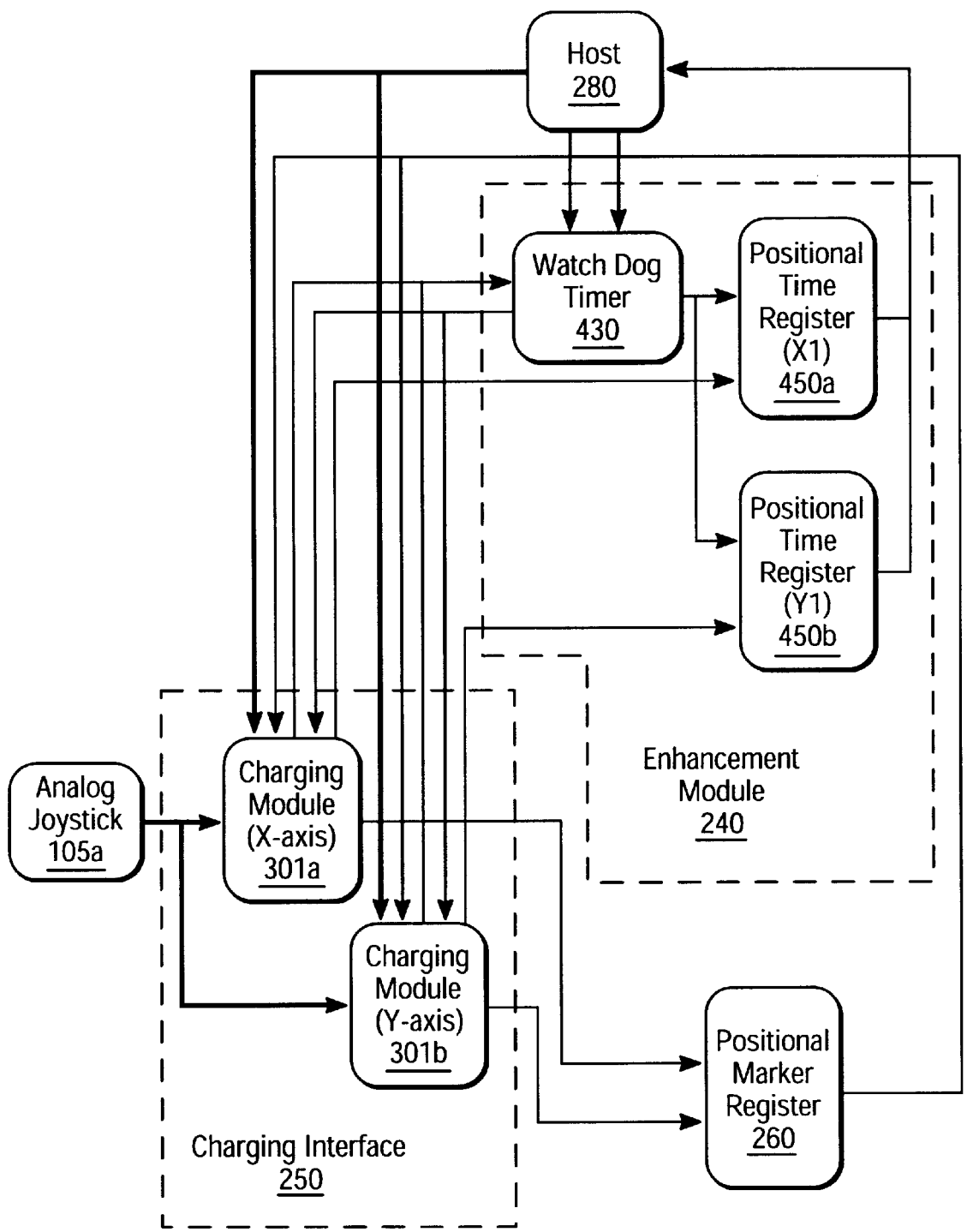
FIG. 4 illustrates a detailed view of the enhancement module of the present invention.

The enhancement module 240, as illustrated in FIG. 4, includes a plurality of positional time registers 450a–b and a watch dog timer 430. In this embodiment, the watch dog timer 430 is a 16 bit clock operating at 500 kHz and the plurality of positional time registers 450a–b are index registers. The watch dog timer 430 includes four inputs as well as two outputs. The first and second inputs are electrically coupled to the second and third outputs of the host 280, respectively. The third and fourth inputs are electronically coupled to transitioners 320a and 320b (not shown), respectively.

To initiate the enhanced mode, the second output of the host 280 transmits an enhanced mode signal $S_{enhanced}$ to the first input of the watch dog timer 430. The third output of the host 280 transmits a $S_{threshold}$ signal, which defines the maximum time value $t_{threshold}$ for the watch dog timer 430, to the second input of the watch dog timer 430. Upon receipt of $S_{enhanced}$, the watch dog timer 430 begins to incrementally increase the watch dog time $t_{watch}$ until it reaches a maximum time value $t_{threshold}$. To ensure proper calculation for the charging cycle time $t_{RC}$ of the charging circuit 301a, the host 280 sets $t_{threshold}$ to a value larger than the theoretical maximum charging cycle time $t_{RCmax}$. When $t_{watch}$ reaches $t_{threshold}$, the first output of the watch dog timer 430 transmits a roll-over signal $S_{roll}$ to the third input of the transitioner 320a. The $S_{roll}$ signal results in the second output of the transitioner 320a transmitting a reset signal $S_{reset}$ to the third input of the watch dog timer 330. Upon receipt of $S_{reset}$, the watch dog timer 330 resets $t_{watch}$ and begins to recount from zero.

At approximately the same time, the first output of the transitioner 320a also transmits a new start signal $S_{start}$ in the "1" logic state to the first input of the circuit interface 310a. As previously discussed in FIG. 3, the circuit interface 310a responds to receipt of $S_{start}$ by initiating a new charging cycle for the charging circuit 101a, which is proportional to the current resistance value of the X-axis potentiometer (not shown) in the analog joystick 105a. Unlike the legacy mode, however, the watch dog timer 430 and not the host 280 serves as a direct timer for the charging cycle time $t_{RC}$. This reallocation of the timing process to the watch dog timer 430 relieves the host 280 from having to continuously poll the positional marker register 260, which inherently monopolizes part of the CPU bandwidth.

In the enhanced mode, when $V_{RC}$ matches $V_{ref}$, the third output of the circuit interface 310a, which is electrically coupled to the positional time register (X1) 450a, transmits a load signal $S_{load}$ to the positional time register (X1) 450a. Upon receipt of $S_{load}$, the positional time register 450a, latches the current time $t_{watch}$ within the watch dog timer 430 and stores this value as the charge cycle time $t_{RC}$ for the charging circuit 101a. Rather than having to continuously poll the positional marker register 260, the host 280 directly obtains this $t_{RC}$ by polling the positional time register 450a once. This alternative polling technique enables the present system 200 to avoid having to continuously poll the positional marker register 260 in order to calculate $t_{RC}$. With this system and method, the system 200 can avoid partially monopolizing the limited CPU bandwidth. One skilled in the art can see that the host 280 can obtain $t_{RC}$ information for the Y-axis of the analog joystick 105a and the X- or Y-axis of any other analog joystick in a similar manner as discussed above with regard to positional time register (X1) 450a.

Having described the present invention with reference to specific embodiments, the above description is intended to illustrate the operation of the preferred embodiment and is not meant to limit the scope of the invention. The scope of the invention is to be limited only by the following claims. From the above discussion, many variations will be apparent to one skilled in the art that would yet be encompassed by the true spirit and scope of the present invention.

What is claimed is:

1. A joystick interface system coupled to a joystick, having a grip variable in orientation, for calculating a digital representation of the orientation of the grip, the system comprising:

a first charging module, coupled to the joystick, for transmitting, at the end of a first time period, a first signal, the first time period corresponding to the orientation of a first axis of the grip;

a first register, coupled to the first charging module, for receiving and storing the first signal; and an enhancement module, coupled to the charging module, for receiving the first signal and for storing a first time value corresponding to the first time period.

2. The joystick interface system of claim 1 wherein the first charging module includes a first charging circuit, coupled to the joystick, for increasing, during the first time period, a first voltage level to a second voltage level and, when the first voltage level increases to the second voltage level, for transmitting a second signal.

3. The joystick interface system of claim 1 wherein the enhancement module includes a timer, coupled to the first charging module for incrementing to the first time value and to a second time value and for transmitting a roll signal upon reaching the second time value.

4. The joystick interface system of claim 1 wherein the system further includes a second charging module, coupled to the joystick, for transmitting, after a second time period, a second signal; the second time period corresponding to the orientation of a second axis of the grip.

5. The joystick interface system of claim 1 wherein the system further includes a host, coupled to the first register, for responding to a first mode signal by continuously polling the first register to detect the storing of the first signal, for calculating the first time value from the detection of the first signal and for transforming the first time value into the digital representation of the orientation of the first axis of the grip; said host, further coupled to the enhancement module, for responding to a second mode signal by transforming the first time value into the digital representation of the orientation of the first axis of the grip.

6. The joystick interface system of claim 3 wherein the enhancement module further comprises a second register, coupled to the first charging module, for receiving the first signal and coupled to the timer, for latching the first timer value, the first time value is less than the second time value.

7. The joystick interface system of claim 4 wherein the enhancement module further includes:

a timer, coupled to the first charging module and the second charging module, for incrementing to the second time value and to a third time value and for transmitting a roll signal upon reaching the third time value; and a second register, coupled to the second charging module, for receiving the second signal and coupled to the timer, for latching the second time value, the second time value is less than the third time value.

8. The joystick interface system of claim 2 wherein the first charging module further includes a circuit interface, coupled to the first charging circuit, for receiving the second signal for transmitting the first signal and for resetting the second voltage level back to the first voltage level.

9. The joystick interface system of claim 3 wherein the first charging module further includes a transitioner, coupled to the timer, for receiving the roll signal and for resetting the timer.

10. The joystick interface system of claim 8 further comprising a transitioner, coupled to the circuit interface, for triggering the resetting of the second voltage level back to the first voltage level.

11. The joystick interface system of claim 7 wherein the enhancement module further includes a third register, coupled to the first charging module, for receiving the first signal and, coupled to the timer, for latching the first time value; the first time value is less than the second time value.

12. A method for calculating a digital representation for an orientation of a grip of a joystick, the method comprising the steps of:

increasing a first voltage level to a second voltage level at a first rate; said first rate corresponding to the orientation of a first axis of the grip;

transmitting a first signal when the first voltage level is increased to the second voltage level;

responding to a first mode signal by storing the first signal; and responding to a second mode signal by generating a first time value wherein said first time value represents the time that elapses in increasing the first voltage level to the second voltage level.

13. The method of claim 12 wherein responding to the first mode signal further comprises the steps of:

continuously polling to detect the storing of the first signal; and calculating a second time value based upon the detection of the first signal, wherein said second time value represents the time that elapses in increasing the first voltage level to the second voltage level.

14. The method of claim 12 comprising the additional step of resetting the second voltage level back to the first voltage level.

15. The method of claim 12 wherein, after generating the first time value, the method comprising the additional step of storing the first time value upon receiving the first signal.

16. The method of claim 12 comprising the additional step of transforming the first time value into a digital representation of the orientation of the first axis of the grip.

17. The method of claim 12 comprising the additional steps of:

increasing a third voltage level to a fourth voltage level at a second rate; said second rate corresponding to the orientation of a second axis of the grip; and transmitting a second signal when the third voltage is increased to the fourth voltage level.

18. The method of claim 17 wherein, after transmitting the second signal, the method comprises the additional step of resetting the fourth voltage level back to the third voltage level.

19. The method of claim 17 comprising the additional step of:

responding to a first mode signal by storing the second signal; and responding to a second mode signal by generating a second time value wherein said second time value represents the time that elapses in increasing the third voltage level to the fourth voltage level.

20. The method of claim 19 comprising the additional step of storing the second time value.

* * * * *